US011387916B1

(12) United States Patent
Thomas et al.

(10) Patent No.: US 11,387,916 B1
(45) Date of Patent: Jul. 12, 2022

(54) THREE-DIMENSIONAL WAFER-STACKED OPTICAL AND RADIO FREQUENCY PHASED ARRAY TRANSCEIVER SYSTEM

(71) Applicant: Raytheon Company, Waltham, MA (US)

(72) Inventors: Matthew C. Thomas, Carpinteria, CA (US); John J. Drab, Arroyo Grande, CA (US); Theodore Mark Kellum, Canyon Country, CA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 17/157,377

(22) Filed: Jan. 25, 2021

(51) Int. Cl.
*H04B 10/80* (2013.01)
*G02F 1/295* (2006.01)

(52) U.S. Cl.
CPC ........... *H04B 10/80* (2013.01); *G02F 1/2955* (2013.01)

(58) Field of Classification Search
None
See application file for complete search history.

(56) References Cited

U.S. PATENT DOCUMENTS

| | | | |
|---|---|---|---|
| 9,154,172 B1 | 10/2015 | Cruz-Albrecht et al. | |
| 10,181,906 B1* | 1/2019 | Harel | H04B 10/2942 |
| 10,243,657 B1* | 3/2019 | Atlas | H04B 10/25753 |
| 10,686,523 B1* | 6/2020 | Gleason | H01Q 21/065 |
| 11,070,269 B2* | 7/2021 | Lee | H01Q 21/28 |
| 2003/0080899 A1* | 5/2003 | Lee | H01Q 3/2682 342/368 |
| 2005/0135811 A1* | 6/2005 | Lee | H04B 10/1125 398/139 |
| 2010/0189439 A1* | 7/2010 | Novak | H04L 12/2898 398/67 |
| 2011/0183618 A1* | 7/2011 | Behzad | H04W 4/80 342/368 |
| 2012/0068880 A1* | 3/2012 | Kullstam | H04B 7/18504 342/81 |
| 2014/0192394 A1* | 7/2014 | Sun | G02F 1/0147 359/238 |
| 2016/0033766 A1* | 2/2016 | Hajimiri | H04B 10/116 348/322 |
| 2016/0036529 A1* | 2/2016 | Griffith | H04B 10/2575 398/116 |
| 2019/0154933 A1 | 5/2019 | Carothers et al. | |
| 2019/0190609 A1* | 6/2019 | Fernando | H04B 10/25759 |

(Continued)

FOREIGN PATENT DOCUMENTS

EP 257964 A * 3/1988 ........... H01Q 3/2676

OTHER PUBLICATIONS

Frenzelm Lou, How Phased Array Antennas Work: One of these exotic antennas is in your future, 2018, pp. 85-87 (Year: 2018).*

(Continued)

*Primary Examiner* — Jai M Lee
(74) *Attorney, Agent, or Firm* — Cantor Colburn LLP

(57) ABSTRACT

A communication system includes an antenna assembly. The antenna assembly includes an optical communication layer including a plurality of electro-optical (EO) antennas for communicating via an EO signal and a radio-frequency communication layer including a plurality of radio frequency (RF) antennas for communicating via an RF signal. A processor operates the antenna assembly to communicate via one or both of the EO signal and the RF signal.

13 Claims, 4 Drawing Sheets

(56) References Cited

U.S. PATENT DOCUMENTS

2019/0267708 A1* 8/2019 Tennant ............... H04B 10/505
2020/0373662 A1* 11/2020 Gleason ................. G01S 17/88
2021/0028534 A1* 1/2021 Liu ........................ H01L 25/18

OTHER PUBLICATIONS

Mudrick et al., Sub-10 μm Pitch Hybrid Direct Bond Interconnect Development for Die-to-Die Hybridization, 2019, IEEE (Year: 2019).*

Chung et al., A Monolithically Integrated Large-Scale Optical Phased Array in Silicon-on-Insulator CMOS, 2017, IEEE (Year: 2017).*

Kuanping Shang, et al., Low-loss compact multilayer silicon nitride platform for 3D photonic integrated circuits, Optics Express 21334, Aug. 10, 2015,vol. 23, No. 16, 9 Pages. DOI:10.1364/OE.23.021334.

SungWon Chung, et al., A Monolithically Integrated Large-Scale Optical Phased Array in Silicon-on-Insulator CMOS, IEEE Journal of Solid-State Circuits, vol. 53, No. 1, Jan. 2018, pp. 1-22.

* cited by examiner

THREE-DIMENSIONAL WAFER-STACKED OPTICAL AND RADIO FREQUENCY PHASED ARRAY TRANSCEIVER SYSTEM

BACKGROUND

The present disclosure relates to communication systems and, in particular, to a system and device for communicating over optical and radio frequency wavelengths.

Aircraft generally communicate with ground control operations over a selected communication medium. During general flight operations, aircraft can communicate with ground systems using optical communications. However, during selected moments of flight operations, optical noise is introduced, making optical communication unreliable. For example, during take-off and landing, dirt and particles can be kicked up into the air, interfering with optical signals. As a result, aircraft can select to communicate over multiple communication frequencies. However, doing so requires additional communication equipment, which adds additional weight to the aircraft. Therefore, there is a need to provide additional communication channels without significantly adding weight to the aircraft.

SUMMARY

According to one embodiment of the present disclosure, an antenna assembly for a communication system is disclosed. The antenna assembly includes an optical communication layer including a plurality of electro-optical (DO) antennas, and a radio-frequency communication layer including a plurality of radio frequency (RF) antennas.

According to another embodiment of the present disclosure, a communication system is disclosed. The communication system includes an antenna assembly and a processor. The antenna assembly includes an optical communication layer including a plurality of electro-optical (EO) antennas for communicating via an EO signal and a radio-frequency communication layer including a plurality of radio frequency (RF) antennas for communicating via an RF signal. The processor operates the antenna assembly to communicate via one of the EO signals and/or one of the RF signals.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

The subject matter which is regarded as the disclosure is particularly pointed out and distinctly claimed in the claims at the conclusion of the specification. The forgoing and other features, and advantages of the disclosure are apparent from the following detailed description taken in conjunction with the accompanying drawings in which:

DETAILED DESCRIPTION

Figure 1:
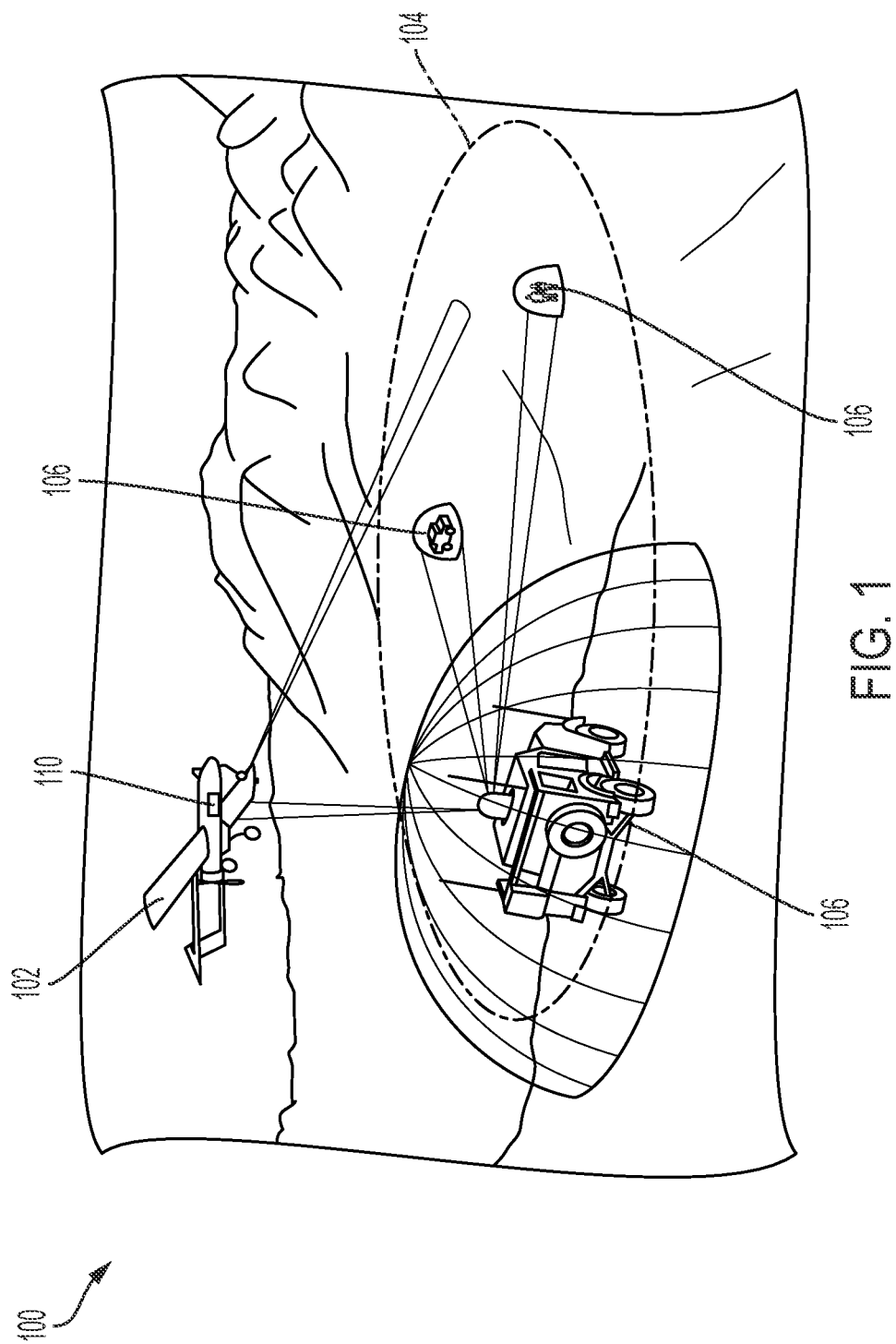
FIG. 1 shows a communication system 100 in an illustrative embodiment.

FIG. 1 shows a communication system 100 in an illustrative embodiment. The communication system 100 includes communication devices conveyed on various vehicles. Aircraft 102, for example, includes a communication device 110 that is capable of communicating with ground-based devices within a selected range 104. Illustrative ground-based devices can include one or more mobile communication stations 106 which are in communication with each other. The mobile communication stations 106 can be mobile vehicles and/or portable hand-held communication devices, in various embodiments. One or more of the mobile communication stations 106 can include a communication device 110 such as used in aircraft 102. The communication device 110 is capable of both electro-optical (EO) communication, such as with signals with wavelengths in the visible or infrared bands, and radio frequency (RF) communication which also includes millimeter wavelength signals. Thus, the aircraft 102 and ground-based communication devices 106 can communicate using either EO communication signals and/or RF communication signals, based on various conditions of the communication media and quality of signals.

Figure 2:
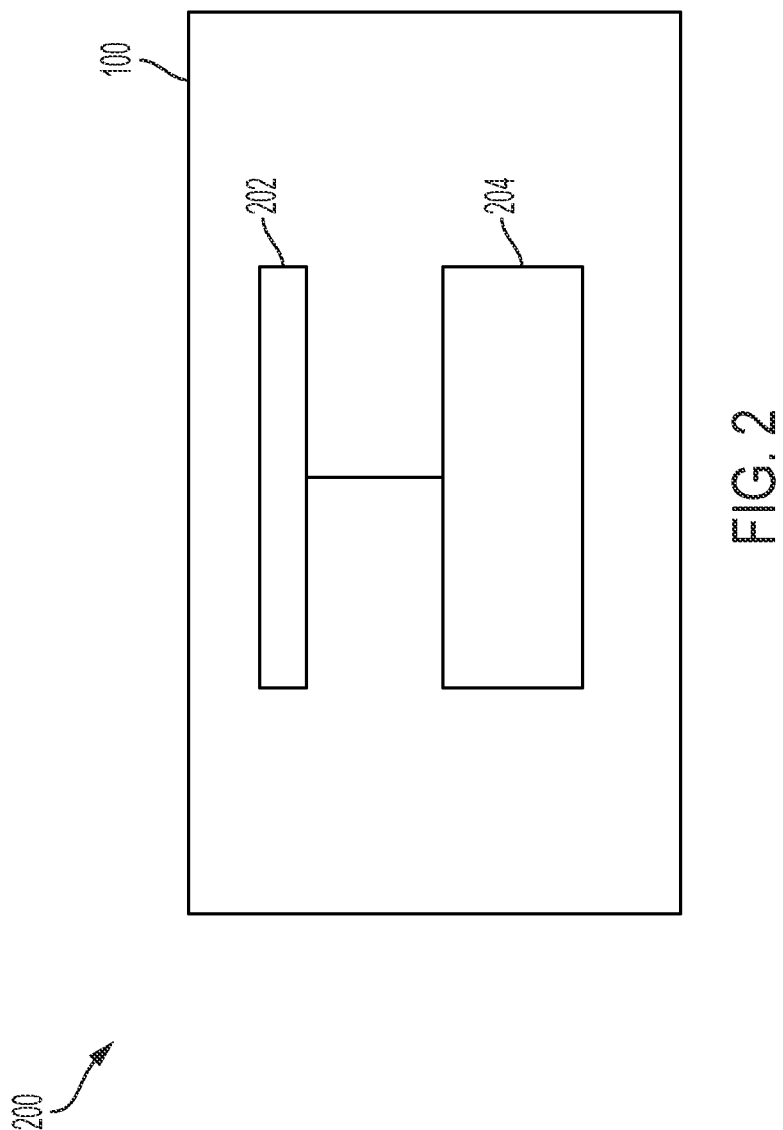
FIG. 2 shows a schematic diagram of a communication device used in the communication system of FIG. 1.

FIG. 2 shows a schematic diagram 200 of the communication device 110 used in the communication system 100 of FIG. 1. The communication device 110 includes an antenna assembly 202 operated by a processor 204. The processor 204 sends signals to the antenna assembly 202 in order to transmit a suitable signal (EO and/or RF). Incoming signals (EO and/or RF) received at the respective antenna assembly 202 are sent to the processor 204 for processing in order to read the received signals. In various embodiments, the antenna assembly 202 includes a plurality of antennas forming at least one phased array. The processor 204 sends communication signals to each of the plurality of antennas with a selected phase delay in order to steer the communication signal in a selected direction using a process known as beam steering. Additionally, the processor 204 is able to determine a direction from which an incoming communication signal is received based on a phase delay between signals received at the antenna assembly 202.

Figure 3:
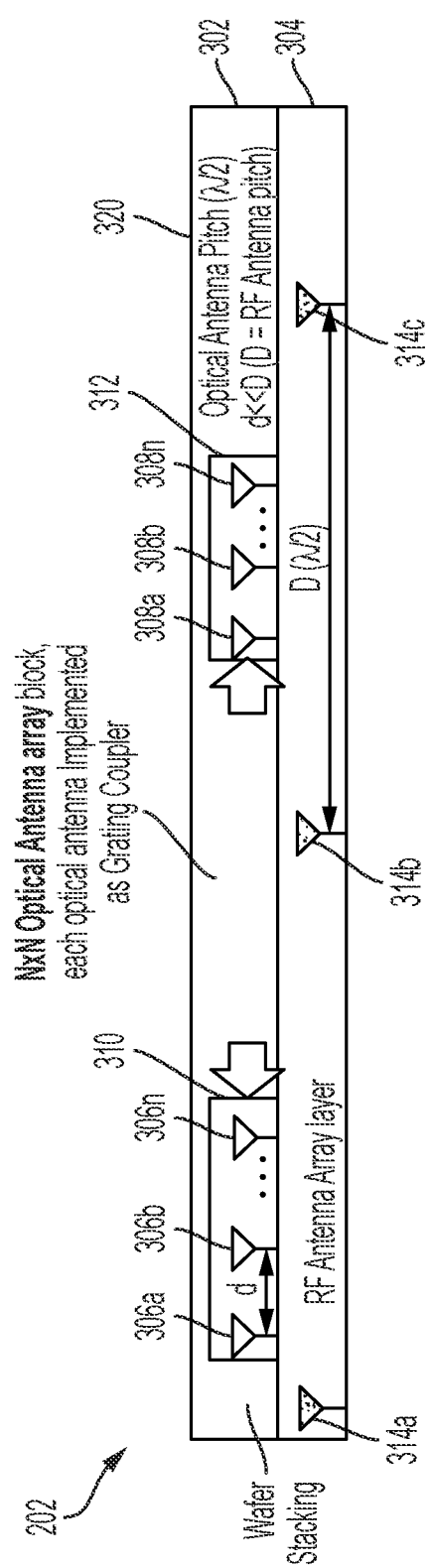
FIG. 3 shows a schematic side view of an antenna assembly of the communication device, in an embodiment.

FIG. 3 shows a schematic side view of the antenna assembly 202 of FIG. 2 in an embodiment. The antenna assembly 202 is a two-dimensional thin-film device that includes an electro-optical (EO) communication layer 302 capable of transmitting and receiving EO signals and a radio frequency (RF) communication layer 304 capable of transmitting and receiving RF signals. Signals are transmitted from and received through an interface 320 of the antenna assembly 202. In various embodiments, interface 320 is an outer surface of the EO communication layer 302 and the RF communication layer 304 is beneath the EO communication layer 304, however this particular order is not meant as a limitation of the disclosure. In various, the RF communication layer 304 can be coincident or above the EO communication layer 304. The RF communication layer 304 passes RF signals via interface 320 by first traversing the EO communication layer 302. The EO communication layer 302 includes a plurality of EO antennas forming an optical phased array. The RF communication layer 304 includes a plurality of RF antennas forming a radio frequency phased array.

The EO communication layer 302 includes a plurality of EO antennas 306a-306n and 308a-308n. In one embodiment, the plurality of EO antennas 306a-306n can form a first EO antenna group 310 and the plurality of EO antennas 308a-308n can form a second EO antenna group 312. One or more of the plurality of EO antennas 306a-306n and 308a-308n can be implemented as a grating coupler. The EO antennas 306a-306n can form a one-dimensional phase array as shown in FIG. 3 or a two-dimensional phase array. Similarly, the EO antennas 308a-308n can form a one-dimensional phased array or a two-dimensional phased array.

Within each EO antenna group, each EO antenna is separated from a nearest neighbor EO antenna by an EO antenna spacing 'd'. To achieve maximum or substantially maximum efficiency, the EO antenna spacing is about half the operating wavelength of an EO signal at the EO communication layer 302. In one embodiment, an optical wavelength of the EO signal is about 2 micrometers (μm), and consequently the EO antenna spacing is selected to be about d=1 μm.

The RF communication layer 302 includes RF antennas 314a-314c. Although the RF communication layer 302 is shown having only three RF antennas for illustrative purposes, it is to be understood that more RF antennas can be included in the RF communication layer 302 and additional groups of EO antenna can be formed in the EO communication layer continuing the antenna sequence shown in FIG. 2. The RF antennas 314a-314c can form a one-dimensional phase array as shown in FIG. 3 or a two-dimensional phase array. Each RF antenna 314a-314c is separated from its nearest neighbor RF antenna by an RF antenna spacing 'D'. The RF antenna spacing is about half the wavelength of the RF signal though other spacings can be used to achieve maximum or substantially maximum efficiency. In one embodiment, an RF wavelength of a RF signal at the RF communication layer 304 is about 10 millimeters (mm), and consequently the RF antenna spacing is about 5 mm, corresponding to a frequency of about 30 Gigahertz (GHz).

The plurality of RF antenna includes a first RF antenna 314a and a second RF antenna 314b. The plurality of EO antennas 306a-306n in the first EO antenna group 310 can be arranged to form a line between the first RF antenna 314a and a second RF antenna 314b. In other words, a plane perpendicular to the interface 320 and containing both the first RF antenna 314a and the second RF antenna 314b also contains the plurality of EO antennas 306a-306n. Similarly, the plurality of EO antenna 308a-308n in the second EO antenna group 312 form a line between the second RF antenna 314b and the third RF antenna 314c. As shown in FIG. 2, the first group 310 and the second group 312 can be separated by a gap at the location an RF antenna (e.g., RF antenna 314b), thereby reducing interference of any RF signals by an otherwise overlying EO antenna.

In various embodiments, the plurality of EO antennas can form a two-dimensional array and the plurality of RF antennas of the RF communication layer can form a two-dimensional array. The two-dimensional array of the EO antennas can include a void at the location of an underlying RF antenna in order to facilitate RF communications.

Referring back to FIG. 2, the processor 204 can select to communicate using either an EO signal or an RF signal based on a parameter of an EO signal. For example, when a quality of an EO signal drops below a selected threshold, then the processor 204 can switch over to transmitting and receiving RF signals. When the quality of an EO signal is above the selected threshold, the processor 204 can switch back to transmitting and receiving EO signals. When the quality of the EO signal is above the selected threshold, the EO signals can be of higher resolution or higher data rate than the RF signals.

Figure 4:
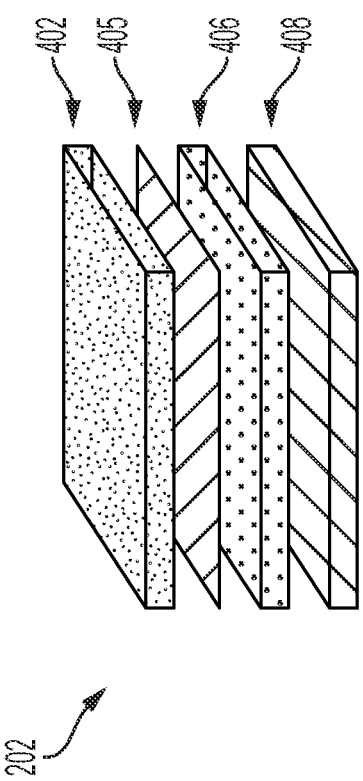
FIG. 4 shows an exploded perspective view of the antenna assembly.

FIG. 4 shows an exploded perspective view 400 of the antenna assembly. The assembly includes a Silicon-Germanium (SiGe) and Complementary Metal Oxide Semiconductor (CMOS) layer 402, a direct bond hybridization layer 404, a silicon photonics layer 406 and a cooling layer 408. The SiGe/CMOS layer 402 includes one or more EO antennas (such as Bragg reflectors), EO amplifiers, RF antennas and RF phase shifters. The silicon photonics (SiPho) layer 406 includes light waveguides and phase shifters for implementing optical beam steering along with optical gratings or similar devices for transmitting the light from the SiPho layer 406 to the SiGe/CMOS layer 402 (also shown in the interposer wafer). The cooling layer 408 includes various microfluid cooling devices therein for maintaining a temperature of the antenna assembly 202.

In is to be understood that the order of the layers is not meant as a limitation to the disclosure. In FIG. 4, the SiGe/CMOS layer 402 includes EO amplifiers and amplifiers along with RF phase shifters and antennas, and the SiPho layer 406 has waveguides and photonic (EO) phase shifters and other photonic integrated circuit (PIC) components. In various embodiments, the SiPho or other photonic components and SiGe/CMOS components are fabricated into a single wafer or layer. Also, in various embodiments, the SiPho layer 406 can includes photonic materials made of material other than Silicon, such as Gallium Nitride (GaN) and Indium Phosphide (InP).

Figure 5:
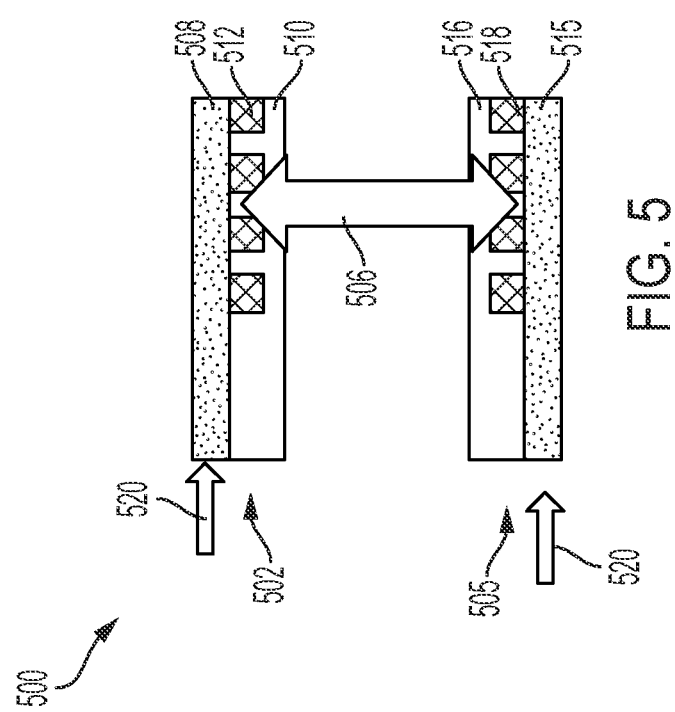
FIG. 5 shows a photonic vertical interconnect between an electro-optic communication layer and a radio frequency communication layer of the antenna assembly.

FIG. 5 shows a photonic vertical interconnect 500 between the EO communication layer 302 and RF communication layer 304, in an embodiment. The photonic vertical interconnect 500 can be used to communicate optical signal between the EO communication layer 302 and the RF communication layer 304. In various embodiments, the photonic vertical interconnect 500 can include a Bragg grating coupler, coupled waveguides, lensed waveguides, detector/transmitter pairs or through-silicon waveguides, etc.

The photonic vertical interconnect 500 includes a first optical communication layer 502 and a second optical communication layer 504 which transfer optical signal 506 between them. The first optical communication layer 502 can be the EO communication layer 302 and the second optical communication layer 504 can be the RF communication layer 304, in various embodiments. The first optical communication layer 502 includes a first waveguide 508 and a first SiO₂ layer 510 adjacent the first waveguide 508. The first SiO₂ layer 510 includes a first Bragg grating 510 therein. Light 520 passing through the first waveguide 508 at the interface between the first waveguide 508 and the first SiO₂ layer 510 is coupled out of the first waveguide 508 and diverted toward the second optical communication layer 504. In addition, light received from the second optical communication layer 504 via the first Bragg grating 510 is coupled into the first waveguide 408 in order to be transmitted along the first waveguide 508.

Similarly, the second optical communication layer 404 includes a second waveguide 514 and a second SiO₂ layer 516 adjacent the second waveguide 514. The second SiO₂ layer 516 includes a second Bragg grating 518 therein. Light 520 passing through the second waveguide 514 at the interface between the second waveguide 514 and the second SiO₂ layer 516 is coupled out of the second waveguide 514 and diverted toward the first optical communication layer 502. In addition, light received from the first optical communication layer 502 via the second Bragg grating 518 is coupled into the second waveguide 514 in order to be transmitted along the second waveguide 514.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for exemplary embodiments with various modifications as are suited to the particular use contemplated.

While the exemplary embodiment to the disclosure had been described, it will be understood that those skilled in the art, both now and in the future, may make various improvements and enhancements which fall within the scope of the claims which follow. These claims should be construed to maintain the proper protection for the disclosure first described.

What is claimed is:

1. An antenna assembly for a communication system, comprising:
    an optical communication layer including a plurality of electro-optical (EO) antennas; and
    a radio-frequency communication layer including a plurality of radio frequency (RF) antennas;
    wherein the plurality of RF antennas includes a first RF antenna and a second RF antenna and the plurality of EO antennas are located between the first RF antenna and the second RF antenna in a plane perpendicular to an interface of the antenna assembly that includes the first RF antenna and the second RF antenna.

2. The antenna assembly of claim 1, wherein an EO antenna selected from the plurality of EO antennas includes a grating coupler.

3. The antenna assembly of claim 1, further comprising a photonic vertical interconnect between the optical communication layer and the radio-frequency communication layer.

4. The antenna assembly of claim 3, wherein the photonic vertical interconnect includes at least one of: (i) a Bragg grating coupler; (ii) coupled waveguides; (iii) lensed waveguides; (iv) detector/transmitter pairs; and (v) through-silicon waveguides.

5. The antenna assembly of claim 1, further comprising a direct-bond hybridization layer between the optical communication layer and the radio-frequency communication layer.

6. The antenna assembly of claim 5, wherein the direct-bond hybridization layer includes a photonic vertical interconnect.

7. The antenna assembly of claim 1, wherein the electro-optical antennas are spaced at an intra-antenna spacing to form a phased array and the radio frequency antennas are spaced at an intra-antenna spacing to form a phased array.

8. A communication system, comprising:
    an antenna assembly comprising an optical communication layer including a plurality of electro-optical (EO) antennas for communicating via an EO signal and a radio-frequency communication layer including a plurality of radio frequency (RF) antennas for communicating via an RF signal; and
    a processor for operating the antenna assembly to communicate via one or both of the EO signal and the RF signal;
    wherein the plurality of RF antennas includes a first RF antenna and a second RF antenna and the plurality of EO antennas are located between the first RF antenna and the second RF antenna in a plane perpendicular to an interface of the antenna assembly that includes the first RF antenna and the second RF antenna.

9. The communication system of claim 8, wherein an EO antenna selected from the plurality of EO antennas includes a grating coupler.

10. The communication system of claim 8, further comprising a photonic vertical interconnect configured to communicate an optical signal between the optical communication layer and the radio-frequency communication layer.

11. The communication system of claim 10, wherein the photonic vertical interconnect includes at least one of: (i) a Bragg grating coupler; (ii) coupled waveguides; (iii) lensed waveguides; (iv) detector/transmitter pairs; and (v) through-silicon waveguides.

12. The communication system of claim 10, further comprising a direct-bond hybridization layer between the optical communication layer and the radio-frequency communication layer, the direct-bond hybridization layer including the photonic vertical interconnect.

13. The communication system of claim 8, wherein the electro-optical antennas are spaced at an intra-antenna spacing to form a phased array and the radio frequency antennas are spaced at an intra-antenna spacing to form a phased array.

* * * * *